United States Patent
Bailey et al.

[11] 3,789,963
[45] Feb. 5, 1974

[54] TRANSMISSION CONTROL SYSTEM

[75] Inventors: Keith A. Bailey, Speedway; Jerry R. Marlow, Greenwood, both of Ind.

[73] Assignee: General Motors Corporation, Detroit, Mich.

[22] Filed: June 5, 1972

[21] Appl. No.: 259,465

Related U.S. Application Data

[62] Division of Ser. No. 21,950, March 23, 1970, Pat. No. 3,682,043.

[52] U.S. Cl.................................. 192/3.57, 74/733
[51] Int. Cl.............................................. B60k 21/00
[58] Field of Search . 91/411 R, 412, 413; 192/3.57, 192/3.3, 3.33, 87.13; 74/733

[56] References Cited
UNITED STATES PATENTS

| | | | |
|---|---|---|---|
| 3,128,642 | 4/1964 | Fisher et al.................. | 192/3.57 X |
| 3,352,392 | 11/1967 | Black et al.................... | 192/3.57 X |
| 3,425,293 | 2/1969 | Krawczyk et al............. | 192/3.57 X |

*Primary Examiner*—Benjamin W. Wyche
*Attorney, Agent, or Firm*—A. M. Heiter

[57] ABSTRACT

A transmission having a torque converter with a lockup clutch and a multi-ratio gear unit having fluid motors to establish the ratio drives. The controls have a shift system including a shift valve selectively supplying each fluid motor with leakage make-up flow to maintain a ratio established and shift flow to establish another ratio, a lockup clutch valve to engage the lockup clutch and a flow valve tripped by a fast change in flow rate on initiating shift flow to disengage the lockup clutch and permitting slow changes in the leakage flow rate without tripping. These flows pass through a restriction providing a differential pressure which selectively actuates the trip control and the response control of the flow valve. The slowly increasing leakage flow rate actuates the response control which increases the size of the restriction or the return biasing force to permit slowly increased leakage flow without actuating the tripping control to trip the flow valve. The response control is unresponsive to the rapid increase of the shift flow rate which only actuates the tripping control to trip the flow valve.

9 Claims, 7 Drawing Figures

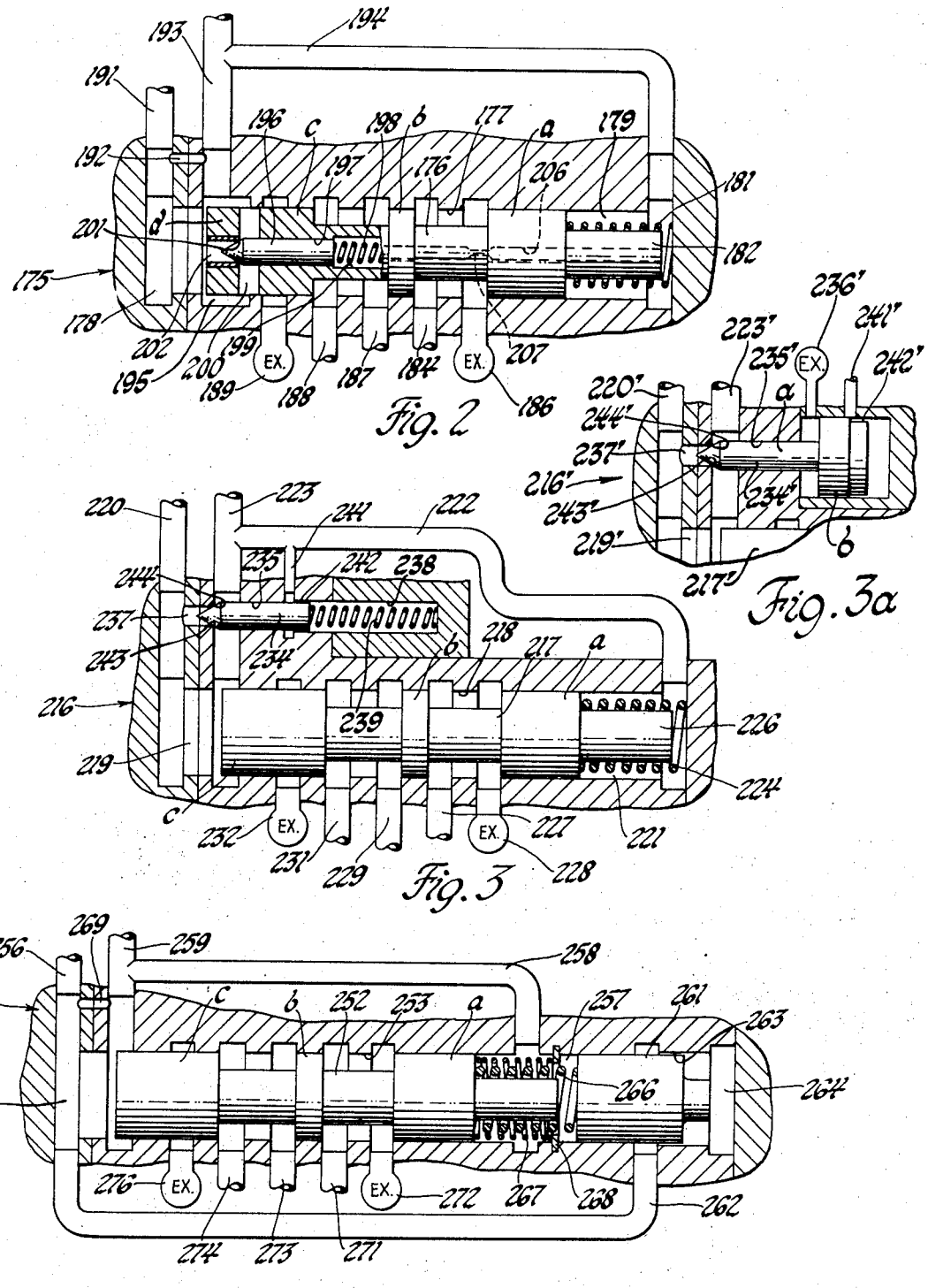

TRANSMISSION CONTROL SYSTEM

This invention relates to transmissions having a control system and particularly to a variable flow responsive control system and is a Division of our U.S. patent application Ser. No. 21,950 filed Mar. 23, 1970, now U.S. Pat. No. 3,682,043, granted Aug. 18, 1972.

SUMMARY OF THE INVENTION

The invention provides an improved power shift transmission having a torque converter with a lockup clutch which is disengaged during a change in drive ratio. This arrangement is also useful in transmissions having a multi-ratio gear unit and another device such as an input clutch or throttle reduction control which is actuated in response to a shift change. A manually or automatically controlled lockup clutch valve controls the supply of fluid from a source to the lockup clutch to selectively engage the lockup clutch and a manually or automatically controlled shift valve controls the supply of fluid from a source to one or more operated devices such as ratio engaging devices to selectively establish a plurality of drive ratios. During the shift change for engagement of a drive ratio the rapidly increased flow of fluid from the source to the ratio engaging device is directed through a restriction to provide a pressure differential to actuate or trip a cut-off or flow responsive valve to control the supply of fluid to the lockup clutch to disengage the lockup clutch during the shift for engagement of a ratio. This actuation of the flow responsive valve is a control step providing a shift signal for the lock-up clutch. When the shift change is completed, the shift change flow ceases and the flow responsive valve is re-set to the untripped condition. The flow responsive valve will not trip in response to slower increases in the flow rate in the operating range. The flow valve trips in response to a predetermined pressure differential due to rapidly increased flow in a short period of time, a high rate of change of flow rate, through a restriction between a source of fluid pressure and the shift control system or work system which includes the shift valve and the shift motors or operated devices. Each ratio drive is maintained established by leakage flow through the restriction to the shift system to make up system leakage and maintain or keep the fluid motor establishing the drive filled under pressure. Leakage flow, the normal flow to maintain a system condition, has a slow rate of change of flow rate with variations in wear and temperature. When leakage flow increases slowly or at a small rate of change of flow rate it provides a slow increase in differential pressure which provides a control modifying signal, or actuates a response control, that after a time delay increases the size of the restriction so the differential pressure increases at a low linear rate with increasing flow rate or increases the return biasing force with differential pressure. On a shift change, the change of flow rate from the leakage flow rate to the shift change or operating flow rate has such a high rate of change of flow rate and the shift change is completed in such a short time period that the delayed response control does not significantly change the size of the restriction or return bias force so the differential pressure increases at a high parabolic rate relative to increasing flow rate to trip the flow valve and provide a controlled device lockup clutch, disengaging signal. Since this signal indicates the presence of operating flow it is also called an operating signal and the signal before the valve trips indicating the absence of operating flow is an inoperating signal.

One type of flow or cut-off valve trips from the lockup supply position to the lockup cut-off position in response to a rapid increase in the flow rate occurring over a small time period flowing through a restriction to cause a high predetermined pressure differential but will accommodate even larger slow increases in the flow rate occurring and existing over a longer period of time and only cause a lower pressure differential insufficient to trip the flow valve. Fluid supply for a ratio change causes a rapid increase in the flow rate and gradually increased leakage in the shift control system slowly increases the flow rate with changes in operating conditions, shifting, wear and temperature, over the life of the transmission. The small time period required for tripping the flow valve in response to shift flow is less than that required to take up the slack in any ratio being engaged so that the flow valve trips to disengage the lockup clutch before torque transmittal in the new ratio is initiated and maintains it disengaged during the completion of the engagement of the new ratio. Gradual slow increases in the flow rate across the restriction caused by leakage are accommodated by a response control, a time delayed variable restriction control valve, which will function, when there is an increased flow for a period longer than that required for a complete ratio change, to increase the size of the restriction so that the increased flow is accommodated with a lower and linear rate of increase of pressure differential with increasing leakage flow. A slow increase in flow rate larger than the rapid increase in flow rate for ratio change may be accommodated without providing the predetermined pressure differential which trips the flow valve. Thus the flow valve will remain in the open position over a wide range of gradually changing leakage flow values but will operate from any of these flow values in response to a smaller rapid change in flow value caused by a shift change to trip the flow valve to close, providing a signal to disengage the lockup clutch. The restriction has a primary or initial calibrated restriction and increases in size or has a secondary variable restriction in parallel increasing the size of the initial restriction in accordance with slowly increasing flow existing for a period of time longer than the shift change period to gradually increase the size of the restriction. Thus the rate of increase of pressure differential with slowly increasing flow rate existing longer than the shift cycle period due to the increasing size of the restriction is linear and thus reduced as compared to the parabolic rate of increase of differential pressure with a rapidly increasing flow rate existing for a shorter period due to the constant size restriction.

In another flow valve the return bias force is gradually increaed with slowly increasing leakage flow to increase the pressure differential required to trip the flow valve with gradually increased flow. A sudden or fast change in flow rate during a shift change will not change the bias force and will trip the flow valve.

These and other features of the invention will be more apparent from the following description.

DESCRIPTION OF DRAWINGS

FIG. 2 shows a modified flow controlled cut-off valve.

FIG. 3 shows another modified flow controlled cut-off valve.

FIG. 3a shows a modification of FIG. 3.

FIG. 4 shows another modified flow controlled cut-off valve.

DETAILED DESCRIPTION OF THE INVENTION

Figure 1:
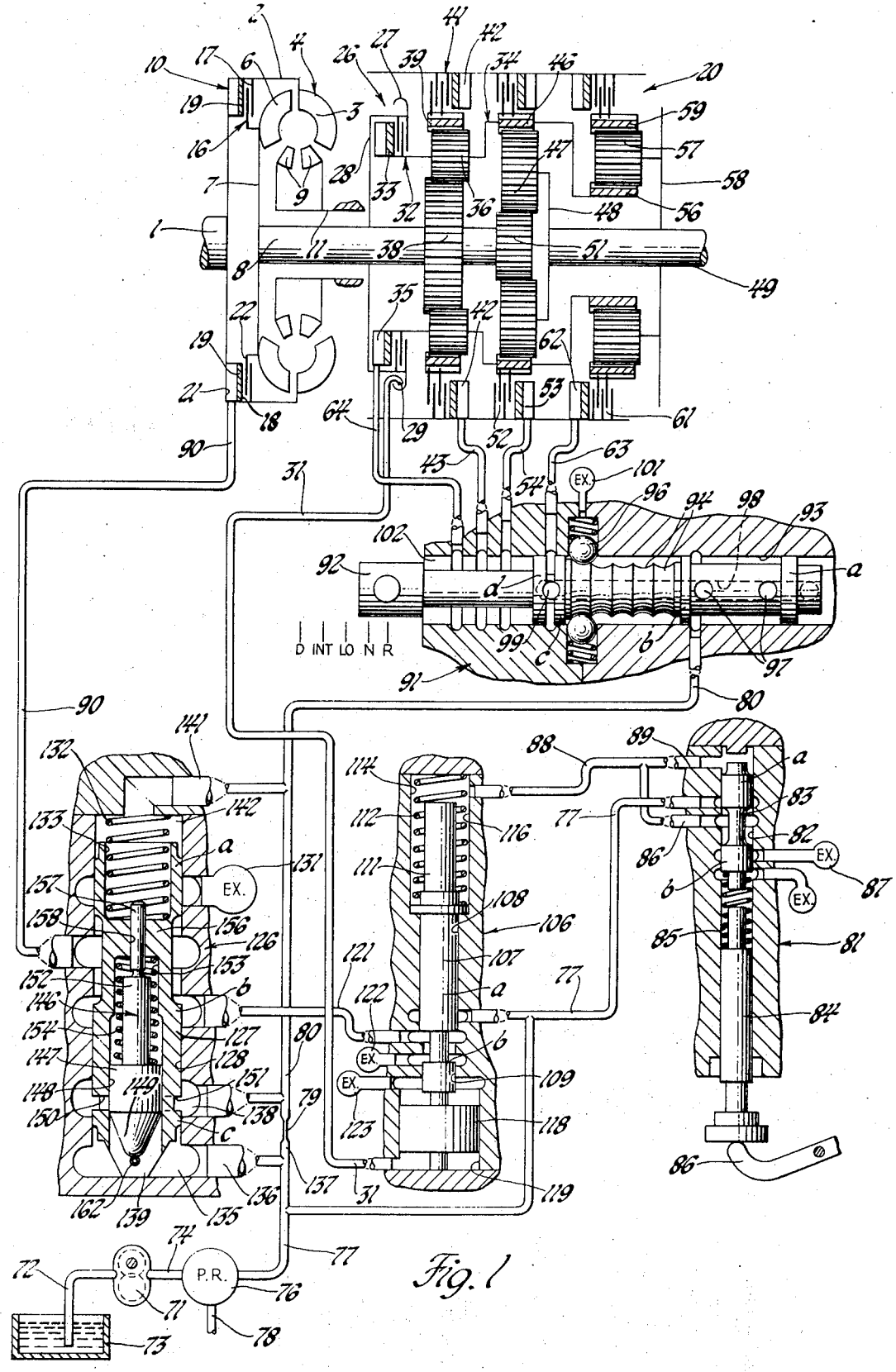
FIG. 1 schematically shows the transmission and control system including the flow controlled cut-off valve.
Figure 5:
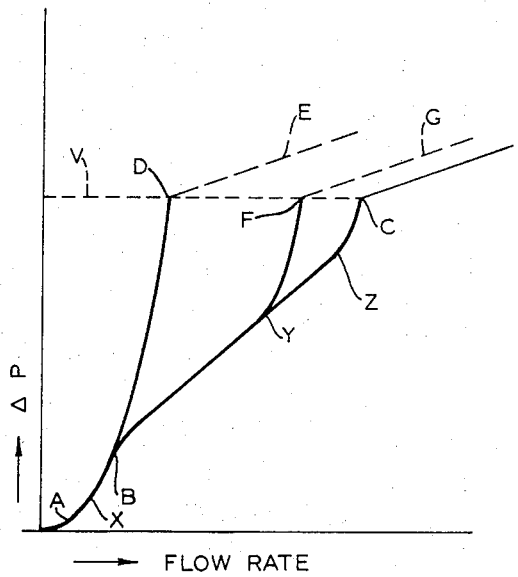
FIG. 5 shows curves illustrating the relation of the flow rate and the pressure differential in the flow valves shown in FIGS. 1 to 3.
Figure 6:
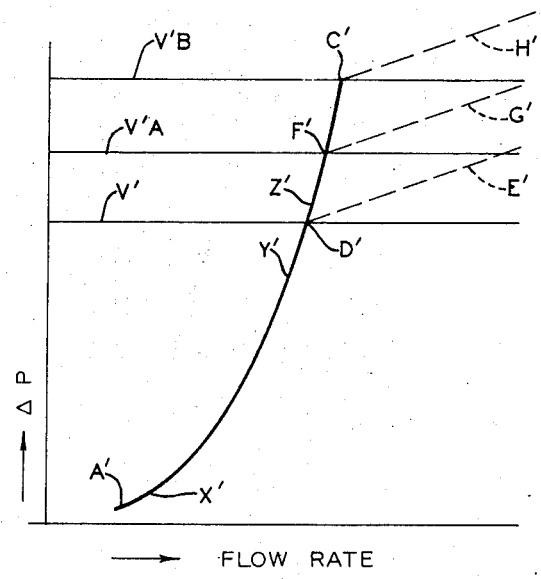
FIG. 6 shows curves illustrating the relation of the flow rate and the pressure differential in the flow valve of FIG. 4.

The Figures illustrate the transmission with flow controlled lockup clutch claimed herein.

For a complete description of our invention as claimed herein, reference is made to our U.S. patent application Ser. No. 21,950 for Flow Control System filed Mar. 23, 1970, now U.S. Pat. No. 3,682,043, granted Aug. 8, 1972.

Reference is made to the entire specification and drawings of Ser. No. 21,950 all of which constitute a disclosure of the invention claimed herein. The disclosure of Ser. No. 21,950 is incorporated herein by reference and made a part hereof as if fully described herein.

The above described modifications will make it apparent that other modifications may be made.

It is claimed:

1. In a transmission; input means; output means; a clutch driven by said input means; multiratio gear means driven by said clutch and driving said output means and having a plurality of fluid motor means selectively operated during a short time period to initially establish and maintained to continue establishment of each of a plurality of ratio drives; a source of fluid under pressure; flow responsive valve means having a fluid passage connected to said source; selector valve means selectively connecting said passage to selected fluid motor means to establish selected ratio drives and causing in said passage a rapid change in flow rate during operation to initially establish a drive ratio, and maintaining flow varying slower with leakage variations to maintain a selected ratio drive and said flow responsive means being responsive to said change in flow rate during operation to disengage said clutch but being unresponsive to the same magnitude of a change of flow rate of said maintaining flow.

2. The invention defined in claim 1 and said flow responsive means being responsive to a controlled pre-set flow rate higher than the last maintaining flow rate to disengage said clutch.

3. The invention defined in claim 1 and said flow responsive means being only responsive to maintaining flow to increase the flow rate at which the clutch is disengaged to prevent clutch disengagement by said maintaining flow over a wide range of flow rates overlapping said operating flow rates.

4. The invention defined in claim 1 and said flow responsive means including a restriction in said passage providing a differential pressure, variable biasing means and means responsive to the differential pressure caused by maintaining flow to increase the force of said variable biasing means proportional to increasing maintaining flow to increase the magnitude of flow required to disengage said clutch with increasing maintaining flow.

5. In a transmission; input means; output means; a clutch driven by said input means; multiratio gear means driven by said clutch and driving said output means and having a plurality of fluid motor means selectively operated during a short time period to initially establish and maintained to continue establishment of each of a plurality of ratio drives; a source of fluid under pressure; flow responsive valve means having fluid passage means connected to said source; selector valve means selectively connecting said passage to selected fluid motor means to establish selected ratio drives and causing in said passage a rapid change in flow rate during operation to initially establish a drive ratio, and maintaining flow, varying slower with leakage variations to maintain a selected ratio drive, and said flow responsive means including a variable restriction in said passage means and being responsive to a predetermined differential pressure across said restriction to trip to disengage said clutch and having means to increase the size of said restriction with increasing maintaining flow existing for long periods but being unresponsive to operating flow existing for short periods to trip in response to operating flow and not in response to maintaining flow even though the flow magnitude is the same.

6. The invention defined in claim 5 and said flow responsive means having a flow responsive movable element and said variable restriction including a fixed restriction and a restriction control valve located in a bore in said flow valve element.

7. The invention defined in claim 5 and said variable restriction having a zero rate restriction control means.

8. The invention defined in claim 5 and said means to increase the size of said restriction having a timing restriction holding said restriction substantially constant under differential pressure existing for said short operating period.

9. A method of controlling a transmission having an input clutch driving a fluid actuated multiratio gear unit having a plurality of fluid motors selectively operable to provide a plurality of drive ratios and receiving continued leakage make-up fluid flow at a flow rate to maintain each selected drive, and the flow rate varying with a small rate of change generally increasing over a large range of flow rate values and operative throughout said range of make-up fluid flow rate values in response to shift change flow having a larger rate of increase in fluid flow rate and a smaller change in value of fluid flow rate than said range of flow rate values of make-up flow during an initial portion of a short shift change period, completing shift change flow continuing at a high rate in a completing portion of said shift change period to establish another selected drive and continued make-up flow to maintain the selected drive; the method of distinguishing between leakage flow and shift change flow of the same or greater value to provide a clutch shift signal, the control step of providing a shift signal for said clutch in response to said smaller increase in flow rate value at said larger rate of change in the rate of flow in said initial portion of said short shift change period and maintaining said shift signal during the completing portion of said short shift change period, and the step of providing a control modifying signal in response to said small rate of change in the rate of make-up flow during leakage flow throughout said range of make-up fluid flow values and existing for a period longer than said shift change period and substantially unresponsive to a change in the rate of flow existing only for said short shift change period modifying the response of the first control step to flow to be unresponsive to changes in leakage flow rate having the same and greater values than said changes in flow rate during said initial portion of said shift change period so changes in leakage flow rate do not provide a shift signal throughout said range of flow rate values.

* * * * *

PO-1050
(5/69)

UNITED STATES PATENT OFFICE
CERTIFICATE OF CORRECTION

Patent No. 3,789,963        Dated February 5, 1974

Inventor(s) Keith A. Bailey et al

It is certified that error appears in the above-identified patent and that said Letters Patent are hereby corrected as shown below:

In the specification, column 1, line 7, "August 18," should be -- August 8, --.

Signed and sealed this 14th day of May 1974.

(SEAL)
Attest:

EDWARD M. FLETCHER, JR.        C. MARSHALL DANN
Attesting Officer               Commissioner of Patents